(12) United States Patent
Sakai et al.

(10) Patent No.: US 8,792,541 B2
(45) Date of Patent: Jul. 29, 2014

(54) COMMUNICATION APPARATUS AND METHOD FOR COMMUNICATION

(75) Inventors: Yuki Sakai, Yokohama (JP); Miyoshi Saito, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 204 days.

(21) Appl. No.: 13/330,043

(22) Filed: Dec. 19, 2011

(65) Prior Publication Data

US 2012/0219045 A1     Aug. 30, 2012

(30) Foreign Application Priority Data

Feb. 28, 2011    (JP) ................................ 2011-042369

(51) Int. Cl.
     *H04L 5/16*       (2006.01)

(52) U.S. Cl.
    USPC ........... 375/222; 375/260; 375/299; 375/349; 375/347; 375/343

(58) Field of Classification Search
    USPC .................. 375/222, 260, 299, 349, 347, 343
    See application file for complete search history.

(56) References Cited

U.S. PATENT DOCUMENTS

| 2008/0170632 A1* | 7/2008 | Sohn et al. ..................... 375/260 |
| 2009/0110094 A1 | 4/2009 | Taylor et al. |
| 2009/0110097 A1 | 4/2009 | Taylor et al. |
| 2009/0110098 A1 | 4/2009 | Taylor et al. |

FOREIGN PATENT DOCUMENTS

| JP | 2007-201848 A | 8/2007 |
| JP | 2009-239886 A | 10/2009 |

* cited by examiner

*Primary Examiner* — Kabir A Timory
(74) *Attorney, Agent, or Firm* — Fujitsu Patent Center

(57) ABSTRACT

An RC generating unit generates a first ranging code by performing a logical operation to first seed data, repeats a process for generating a second ranging code by performing the logical operation to second seed data generated when generating the first ranging code until generation of a Nth ranging code, stores the 1st through Nth seed data corresponding to the 1st through Nth ranging codes in the memory. And the RC generating unit generates a transmission ranging code, in response to a reception of specification data of a transmission ranging code transmitted from a base station, by performing the logical operation to the seed data corresponding to the specification data.

10 Claims, 16 Drawing Sheets

RC#1 : $C_{1\_1} C_{1\_2} C_{1\_3} \cdots C_{1\_142} C_{1\_143} C_{1\_144}$

RC#256 : $C_{256\_1} C_{256\_2} C_{256\_3} \cdots C_{256\_142} C_{256\_143} C_{256\_144}$

COMMUNICATION APPARATUS AND METHOD FOR COMMUNICATION

CROSS-REFERENCE TO RELATED APPLICATIONS

This application is based upon and claims the benefit of priority of the prior Japanese Patent Application No. 2011-42369, filed on Feb. 28, 2011, the entire contents of which are incorporated herein by reference.

FIELD

Embodiments discussed herein relate to a communication apparatus and a method for communication.

BACKGROUND

When communication between a base station and, for example, a communication apparatus functioning as a mobile-station is performed by, for example, WiMAX (Worldwide Interoperability for Microwave Access), ranging (Ranging) is performed. The ranging between the base station and the communication apparatus is performed by, for example, synchronizing communication between the base station and the communication apparatus, adjusting a transmission power level of the communication apparatus, and maintaining a quality of a communication link.

The communication apparatus transmits, prior to ranging, a ranging code, which is a code for transmission control, to the base station. The base station identifies the communication apparatus on the basis of received ranging code, and transmits a ranging response message to the identified communication apparatus. This ranging response message includes the ranging code which the base station received, an adjustment parameter such as a transmission power level, and information (status information) indicating whether or not the ranging is finished.

The communication apparatus adjust the transmission power level or the like on the basis of the adjustment parameter of the received ranging response message. After this adjustment, the communication apparatus again transmits the ranging code to the base station to confirm whether the adjusted transmission power level is appropriate.

A series of the above processes are repeatedly performed between the base station and the communication apparatus, and the communication apparatus, when receiving ranging termination information (success information) from the base station, aborts transmission of the ranging code and terminates the ranging. Thereafter, the base station performs processes such as an assignment of CID (Connection Identifier) to the communication apparatus which has terminated the ranging, and keeps the communication apparatus under control, thus a communication link being established.

Here, this ranging code is generated by the communication apparatus on the basis of a ranging code generating parameter transmitted by broadcasting from the base station. The ranging code has 256 patterns as usable code patterns, wherein each ranging code consists of 144 bits and is generated by a pseudo random binary sequence (PRBS) generator.

FIG. 1 is a transmission and reception timing diagram of radio frames transmitted or received when communication is performed between the base station and the communication apparatus (the mobile-station).

FIG. 2 is a timing diagram illustrating generation and transmission processes of the ranging code performed by the communication apparatus. Timings T1 through T4 of FIG. 2 respectively correspond to the timings T1 through T4 of FIG. 1.

The communication apparatus, when starting communication with the base station, receives, at the timing T1 of FIG. 1, a down-link sub-frame (abbreviated as "DL sub-frame" hereinafter) transmitted from the base station. Then, as illustrated in FIG. 2, a MAC (Medium Access Control) unit of the communication apparatus parses an UCD (Uplink Channel Descriptor) of the DL sub-frame (process S1), obtains an UL_Permbase (Uplink_Permutationbase) information specified by the UL-MAP which already has been received, and obtains a ranging code generating parameter GP. Further, the MAC unit continues this parsing until obtaining the specification data D of the ranging code from the DL sub-frame.

An UL_PHY (Uplink Physical Layer) unit generates from this generating parameter, by using, for example, the PRBS generator, 256 pieces of ranging codes each consisting of 144 bits one after another, and stores these in a memory (process S2 of FIG. 2).

Further, at the timing T2, the communication apparatus does not perform a transmission process of data related to the ranging by using up link sub-frame (abbreviated as "UL sub-frame" hereinafter). Similarly, at the timing T3, data process related to the ranging with regard to the received DL sub-frame.

The MAC unit of the communication apparatus consecutively performs parsing the UCD (process S3 of FIG. 2), and receives (obtains) specification data D of the ranging code. The specification data D is data for the base station to specify any one of the 256 pieces (patterns) of the ranging codes and to command the communication apparatus to transmit the specified ranging code to the base station.

The UL_PHY unit of the communication apparatus reads out a ranging code for transmission corresponding to the specification data D from among the 256 pieces of ranging codes stored in the memory, and transmits the read out ranging code to the base station. Hereafter, on the basis of this ranging code, a ranging is performed between the base station and the communication apparatus. Here, the number of bits of the ranging code, and the number of pieces to be generated are illustrative examples.

As above, the UL_PHY unit of the communication apparatus previously generates 256 pieces of the ranging codes possibly specified by the specification data before receiving the specification data, and stores the ranging codes into the memory. The reason for that is that, within a certain period of time after the reception of the specification data, it is required to transmit the ranging code corresponding to the specification data to the base station.

For example, assumption is made such that, in response to the specification data D received (obtained) at the timing T3, the communication apparatus transmits the 250th ranging code specified by the specification data D at the timing T4. In this case, if the communication apparatus starts generating the ranging code corresponding to the specification data D at the timing T3 at which the specification data is received (process S5 of FIG. 2), the communication apparatus takes long time before generating the 250th ranging code and is not able to transmit the ranging code to the base station by the timing T4 for transmission.

Here, the previously described memory needs a capacity for storing 256 pieces of 144 bit ranging codes, which is at least about 4.6 K Byte (144 bit*256/8). Also, since the communication apparatus is capable of transmitting at most three types of the ranging codes, the memory capacity as much as three times of the above, which is at most about 13.8 K Byte (4.6 K Byte*3), is required. As such, using the memory capacity as much as about 13.8 K Byte solely for transmitting the ranging code is unproductive.

SUMMARY

According to one aspect of the embodiment, a communication apparatus comprising: a transmitting and receiving unit which performs a transmission and reception of data with a base station, a generating unit which generates a ranging code based on seed data including a binary sequence shorter than the ranging code which is a code for transmission control, a memory which stores the seed data, wherein the generating unit generates a first ranging code by performing a logical operation to first seed data, repeats a process for generating a second ranging code by performing the logical operation to second seed data generated when generating the first ranging code until generation of a Nth ranging code, stores the 1st through Nth seed data corresponding to the 1st through Nth ranging codes in the memory, and generates a transmission ranging code by performing the logical operation to the seed data corresponding to a specification data of the transmission ranging code received from the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTIONS OF EMBODIMENTS

The First Embodiment

Figure 3:
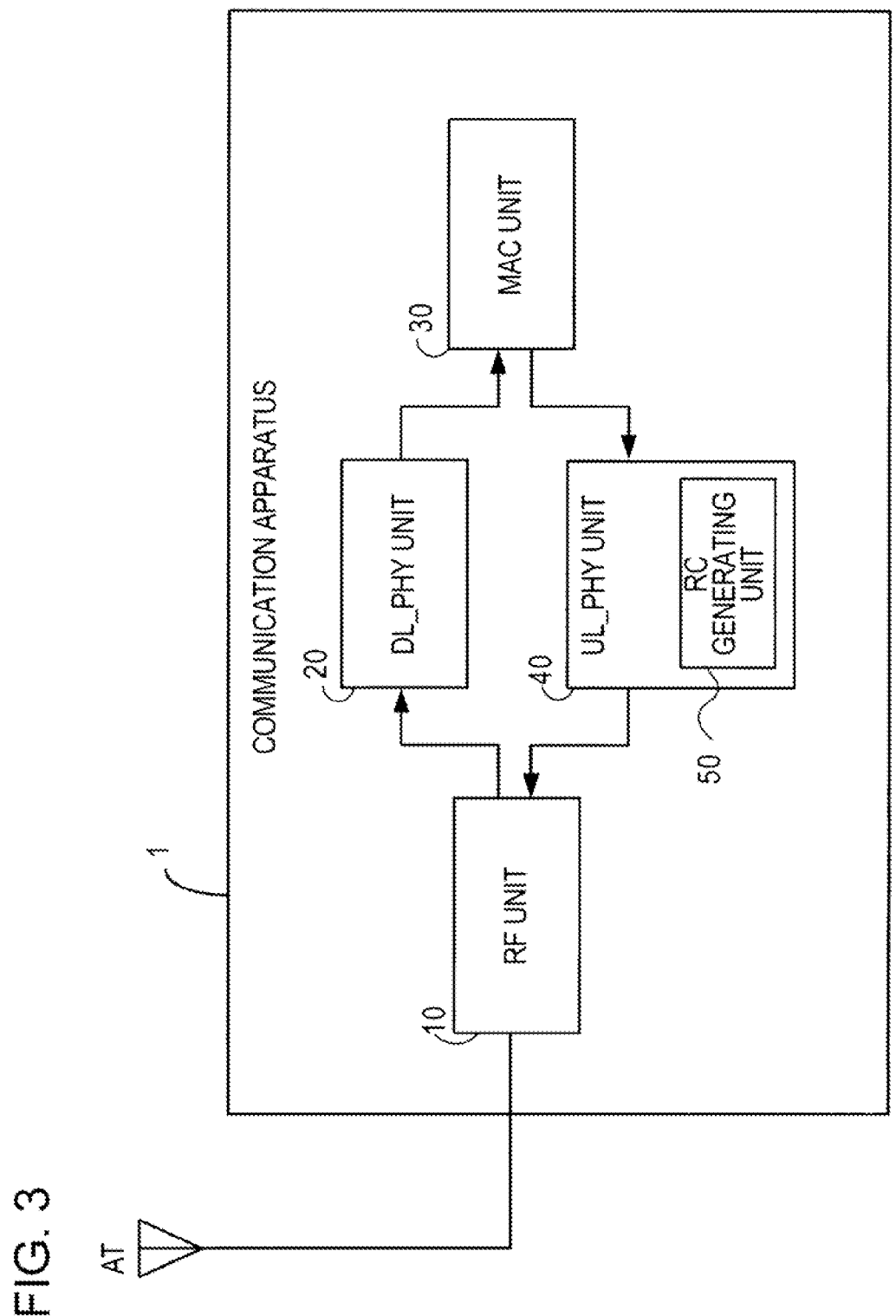
FIG. 3 is a functional block diagram of the communication apparatus for illustrating the first embodiment.

FIG. 3 is a functional block diagram of a communication apparatus for illustrating the first embodiment. A communication apparatus 1 receives by an antenna AT a DL sub-frame transmitted from base station (not illustrated) of the communication apparatus 1. The communication apparatus 1 functions as a mobile-station or a relay station.

The communication apparatus 1 includes a RF (Radio Frequency) unit 10 which performs the above descried reception and a transmission of a UL sub-frame to the base station via the antenna AT, a DL_PHY (DownLink Physical Layer) unit 20 which performs a demodulation process to signals input from the RF unit 10 to obtain demodulated signals, a MAC unit 30 which performs management of a data-link, and a UL_PHY unit 40 which performs a modulation process to signals input from the MAC unit 30 to obtain transmission signals.

The RF unit 10 amplifies signals received by the antenna AT, downconverts the amplified signal, and outputs the downconverted signal to the DL_PHY unit 20. Also, the RF unit 10 amplifies signal for transmission input from the UL_PHY unit 40, upconverts the amplified signal, and transmits the upconverted signal by the antenna AT to the base station. The RF unit 10 is an example of a transmitting and receiving unit, which performs a transmission and reception of data with the base station.

The DL_PHY unit 20 performs to a signal input from the RF unit 10 a synchronization process of the radio frame, a FFT (Fast Fourier Transform) process, a demodulation process, an error code correction and the like, and obtains reception data.

The MAC unit 30 has functions such as packet data convergence protocol sublayer, MAC common subLayer, and a security sublayer. For example, the MAC unit 30 extracts a protocol data unit (PDU) from the reception data, and performs a process to output the reception data to the subsequent application (not illustrated), and a process to generate transmission data from data input from the subsequent application and to output the generated data to the UL_PHY unit 40.

The UL_PHY unit 40 coding the transmission data input from the MAC unit 30 as an error correction code, modulates it, performs an IFFT (Inverse Fast Fourier Transform) process, and outputs the signal after IFFT for transmission to the RF unit 10. The generating unit 50 of the UL_PHY unit 40 generates the ranging code.

Figure 4:
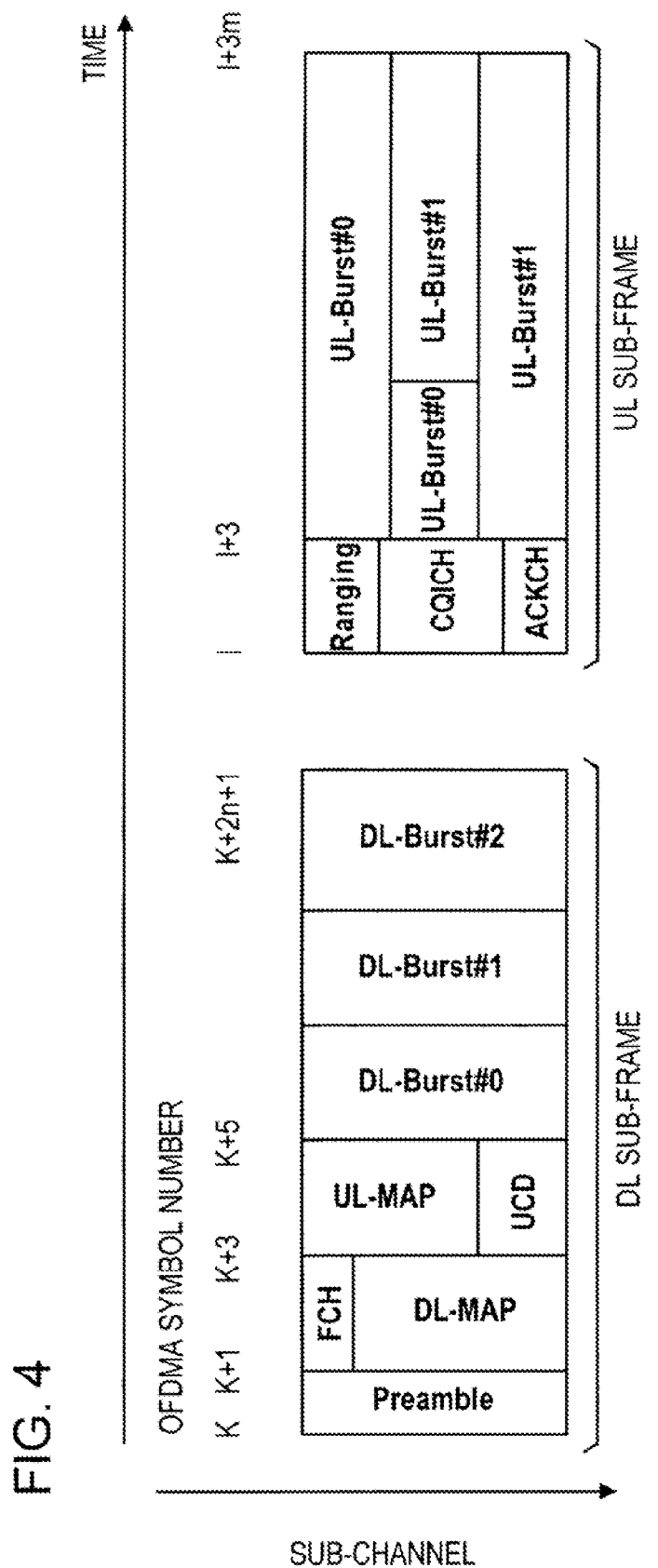
FIG. 4 is a drawing for illustrating an example of a radio frame used when a communication between the base station and the mobile-station is performed by WiMAX.

FIG. 4 is a drawing for illustrating an example of a radio frame used in a communication by WiMAX between the base station and the communication apparatus 1. The radio frame includes the DL sub-frame used by the base station when transmitting data to the communication apparatus 1 and the UL sub-frame used by the communication apparatus 1 when transmitting data to the base station. The DL sub-frame and the UL sub-frame have a time-axis and a subchannel-axis, wherein each subchannel respectively corresponds to OFDMA (Orthogonal Frequency Division Multiple Access) symbol number corresponding to the time-axis.

A synchronization signal of the DL sub-frame is stored in a preamble region of the DL sub-frame. Configuration information of the DL sub-frame is stored in a FCH (Frame Control Header) region. Radio assignment information within the DL sub-frame, or burst allocation information in the DL sub-frame is stored in a DL-MAP region. Radio assignment information within the UL sub-frame, that is, burst allocation information in the UL sub-frame is stored in the UL-MAP region. UCD such as the ranging code generating parameter (abbreviated as a generation parameter, hereafter), the specification data of the ranging code, the starting position of UL sub-frame at the radio frame, and the number of OFDMA symbols is stored in a UCD region.

In a ranging region of UL sub-frame, the ranging code is stored. And, in a CQICH (Channel Quality InfoChanel) region, carrier to interference and noise ratio (CINR) and various information for processes demanding faster response time at the DL_PHY unit 20 and the MAC unit 30 (fast-feedback region). In the ACKCH region, ACK/NAK for hybrid automatic repeat request (HARQ) transmitted from the base station are stored. In the UL-Burst #0, #1 regions, user data is stored.

The MAC unit 30 of FIG. 3 parses the UCD of the DL sub-frame, obtains UL_Permbase information (7 bits) of the UL-MAP region which is already received, and thereby generates generating parameter. Then, the MAC unit 30 outputs the generating parameter to the RC generating unit 50 of the UL_PHY unit 40. Further, by the above parsing, the MAC unit 30 obtains the ranging code information (or the ranging code number), that is, the specification data of the ranging code, and outputs it to the RC generating unit 50.

Figure 5:
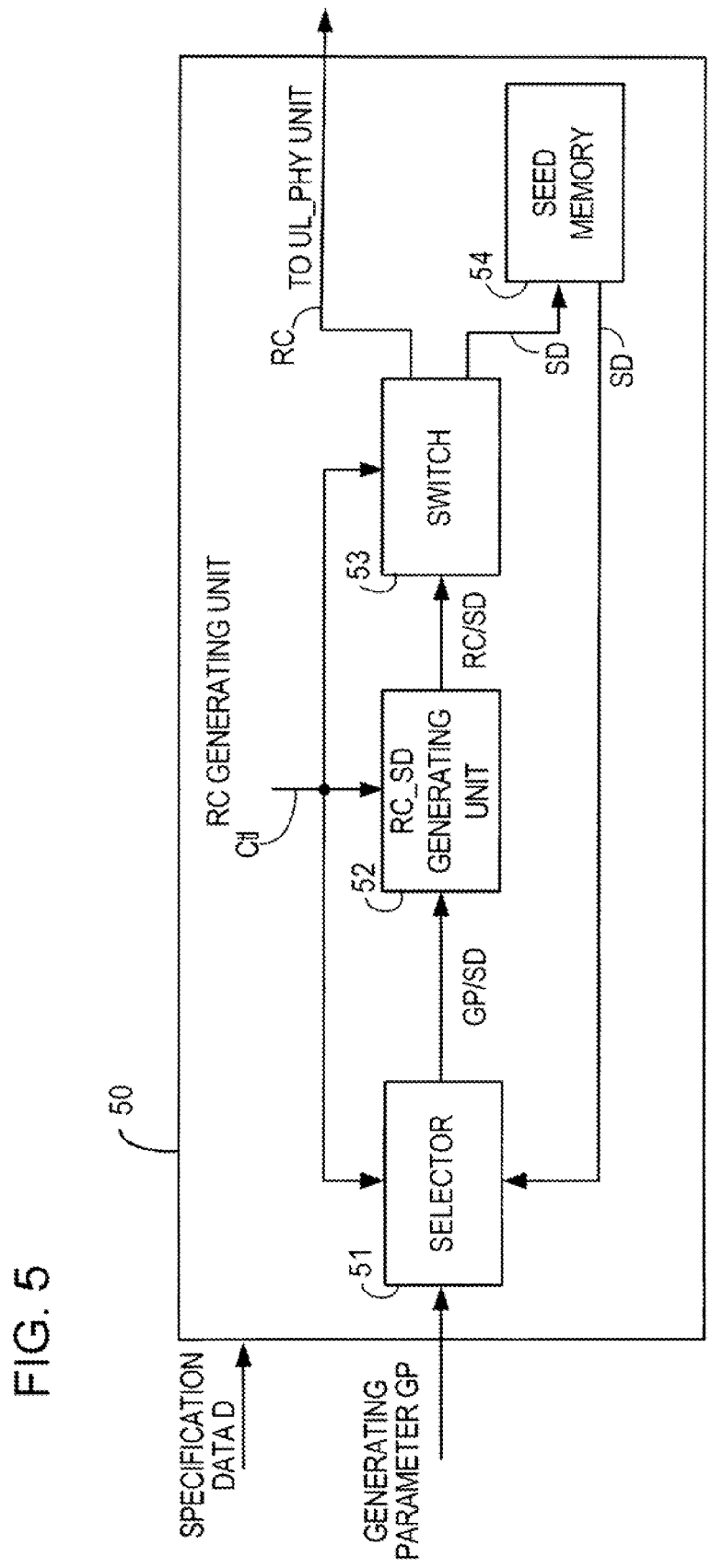
FIG. 5 is a functional block diagram of an RC generating unit which generates the ranging code.

FIG. 5 is a functional block diagram of the RC generating unit 50. The RC generating unit 50 includes a selector 51 which performs an output selection on the generating parameter GP input from the MAC unit 30 and the seed data SD input from the seed memory 54, an RC_SD generating unit 52 which has the PRBS generator illustrated in FIG. 6 and generates seed data SD for generating the ranging code RC and the ranging code RC, a switch 53 which outputs the ranging code RC input from the RC_SD generating unit 52 to the UL_PHY unit 40 and outputs the seed data SD input from the RC_SD generating unit 52 to the seed memory 54, and a seed memory 54 which stores the seed data SD.

The RC_SD generating unit 52 generates the ranging codes one after another on the basis of data having a binary sequence shorter than the ranging code (referred to as seed data, hereafter).

For example, the RC_SD generating unit 52 generates the first ranging code by repeatedly performing a logical operation to the first seed data having the ranging code generating parameter GP received from the base station and arbitrary data. Then, the RC_SD generating unit 52 repeats a process to repeat performing logical operations to the second seed data generated when the first ranging code is generated to generate the second ranging code, until the Nth ranging code is generated. N is an integer, for example, equal to or less than 256, preferably 256. The RC_SD generating unit 52 stores in the seed memory 54 the 1st through Nth seed data corresponding to the 1st through Nth ranging codes.

Also, the RC_SD generating unit 52 performs repeatedly the logical operations to the seed data corresponding to the specification data D of the ranging code for transmission (transmission ranging code) received from the base station, generates the transmission ranging code, and transmits it to the base station.

Figure 6:
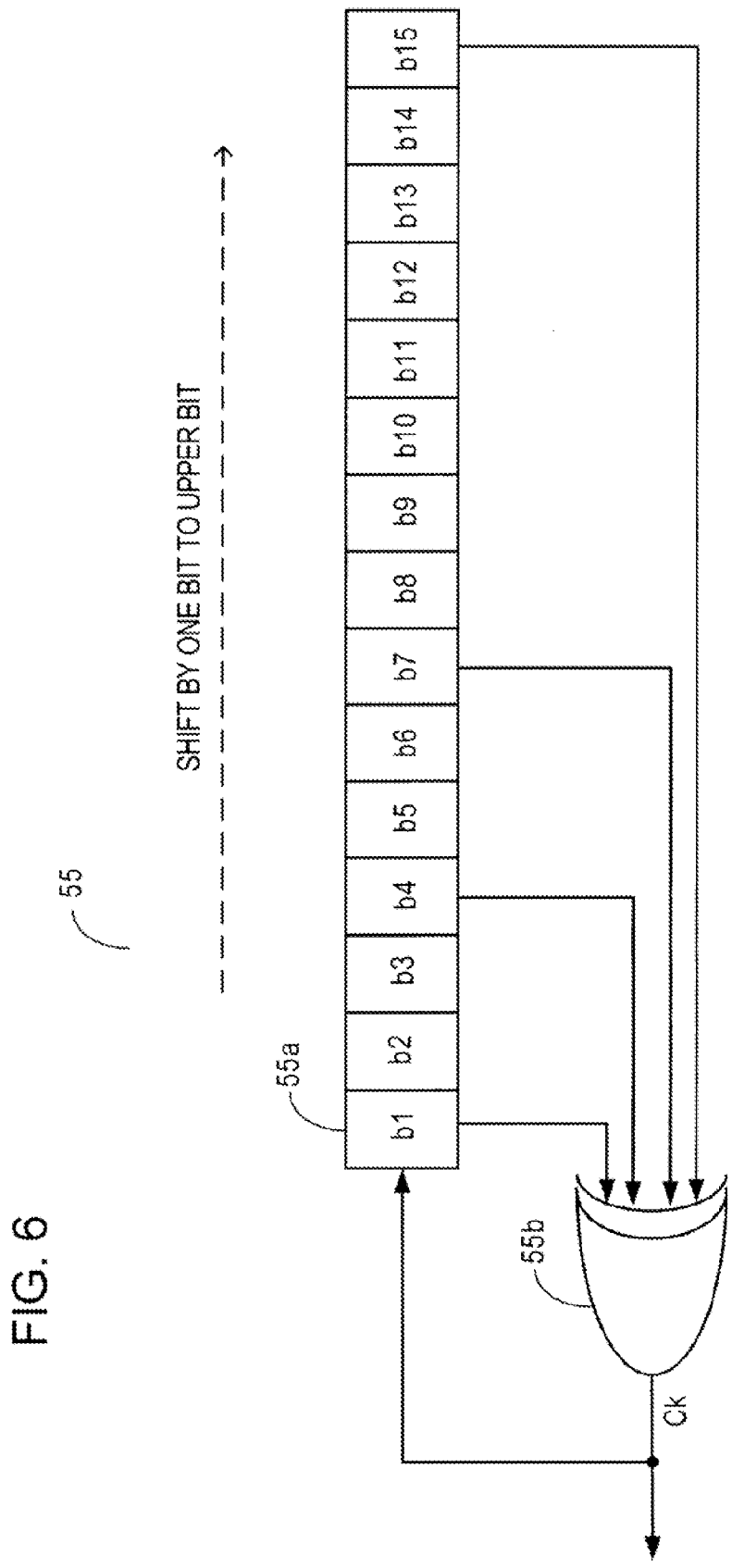
FIG. 6 is a drawing for illustrating an example of a ranging code generating circuit.

FIG. 6 illustrates a PRBS generator, as an example of the ranging code generating circuit which the RC_SD generating unit 52 includes. The PRBS generator 55 includes a register 55a at which the seed data is set and a logic circuit 55b which performs logical operations to the seed data of the register 55a to generate logic data.

The register 55a has 15 bit capacity and a region b1 through b15 each of which is set with one bit. Here, the bit of the setting region b1 is the least significant bit (LSB), and the bit of the setting region b15 is the most significant bit (MSB).

The logic circuit 55b is assumed to be a XOR (exclusive logical addition) circuit which computes XOR data Ck of some bits of the seed data set at the register 55a, for example, bits set at the 1st, 4th, 7th, and 15th digit counted from the least significant bit of the register 55a (the setting regions b1, b4, b7, and b15).

The RC_SD generating unit 52 computes by a logic circuit 55b the XOR data Ck of bits set at the setting regions b1, b3, b7, and b15 of the register 55a, as one bit constituting the ranging code. Then, the RC_SD generating unit 52 shifts a binary sequence set at the setting regions b1 through b14 to the upper bits in sync with the reference clock for bit-shift, and, together with this, repeats a plurality of times a process to input the computed XOR data Ck into the setting region b1, which is an empty bit region of the register 55a and to store new seed data into the register 55a. Further, after inputting the computed XOR data Ck into the setting region b1 in sync with the reference clock for bit-shift, the RC_SD generating unit 52 computes the subsequent XOR data.

As such, the RC_SD generating unit 52 performs logical operation process to repeat a plurality of times the above described process to generate one ranging code having the plurality of XOR data. Here, the "a plurality of times" is 144 times, which corresponds to the number of bits of the ranging code, 144 bits. The RC_SD generating unit 52 repeats the above described computing process of the XOR data and bit-shift process 144 times, and thereby generates the ranging code consisting of 144 bits. "RC#1:$C_{1\_1}C_{1\_2}C_{1\_3} \cdots C_{1\_142}C_{1\_143}C_{1\_144}$" of FIG. 7 is the first generated ranging code.

Figure 7:
FIG. 7 is a drawing for schematically illustrating 256 pieces of the ranging codes RC#1 through #256.

By the RC_SD generating unit 52 repeating another 256 times the process including the above computation process of the XOR data and the bit-shift process, which is repeated 144 times, that is, repeating the logical operation process for generating the ranging code 256 times, 256 pieces of the ranging codes RC#1 through #256, as illustrated in FIG. 7, are generated.

Figure 8:
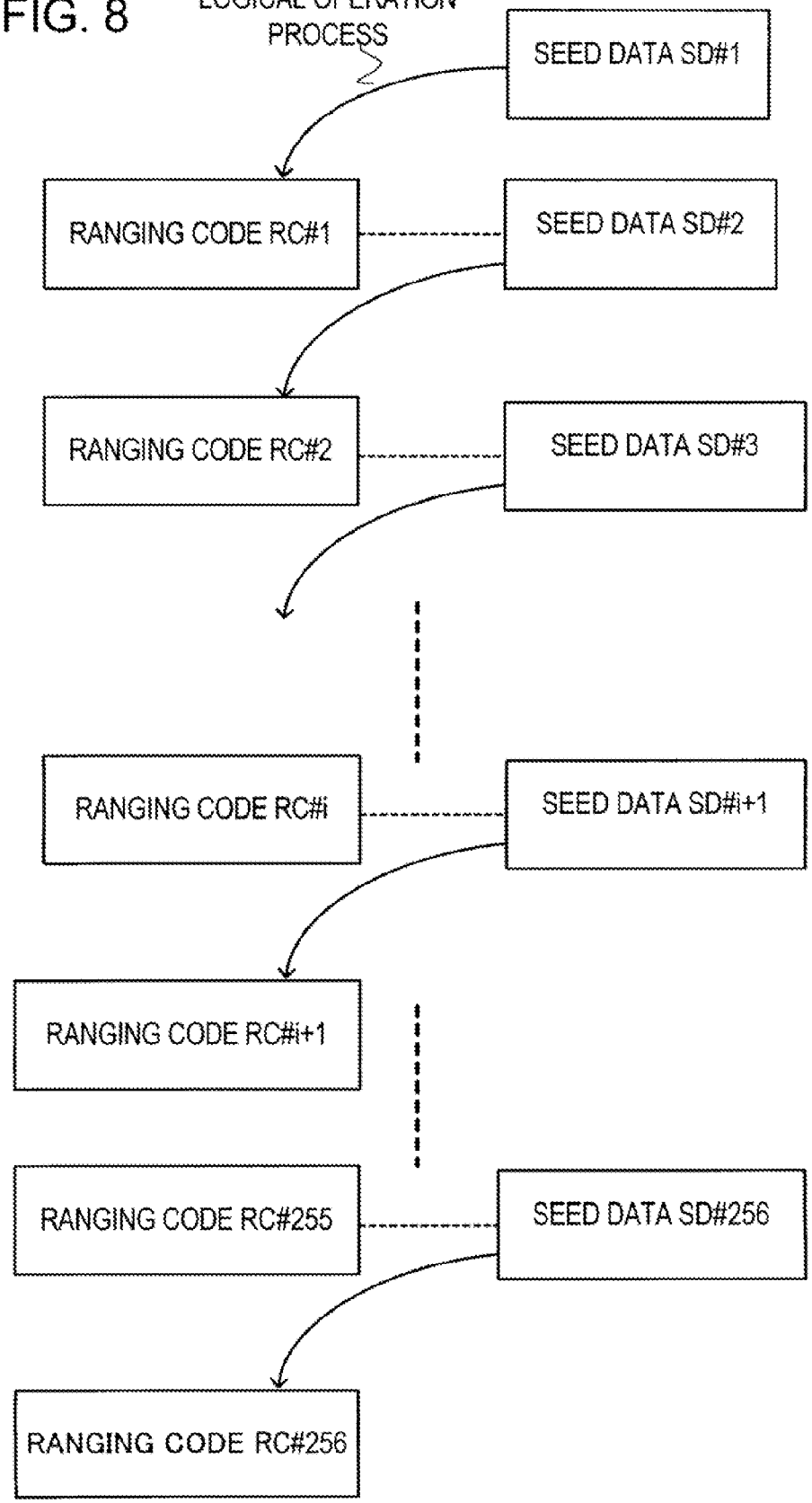
FIG. 8 is a drawing for illustrating relations between the seed data and the ranging code.

FIG. 8 is a schematic diagram for illustrating relations between the seed data and the ranging codes.

The RC_SD generating unit 52 generates the first ranging code RC#1 by performing the above described logical operation process to the first seed data SD#1 having the ranging code generating parameter and arbitrary data. Then, the above described logical operation process is performed to the second seed data SD#2 set at the register 55a when the first ranging code RC#1 is generated, and the second ranging code RC#2 is generated. Then, the generated seed data is stored in the seed memory 54. That is, the RC_SD generating unit 52 stores into the seed memory 54 the (i+1)th seed data set at the register 55a when generating the ith (i≥1) ranging code. Then, the RC_SD generating unit 52 performs the above described logical operation process to the (i+1)th seed data, and, thereby, generates the (i+1)th ranging code. Further, the 1st seed data SD#1 is also stored in the seed memory 54. As such, the RC_SD generating unit 52 stored all the generated seed data (256 pieces of the seed data) into the seed memory 54. The bit length of this seed data is 15 bit length.

Figure 9:
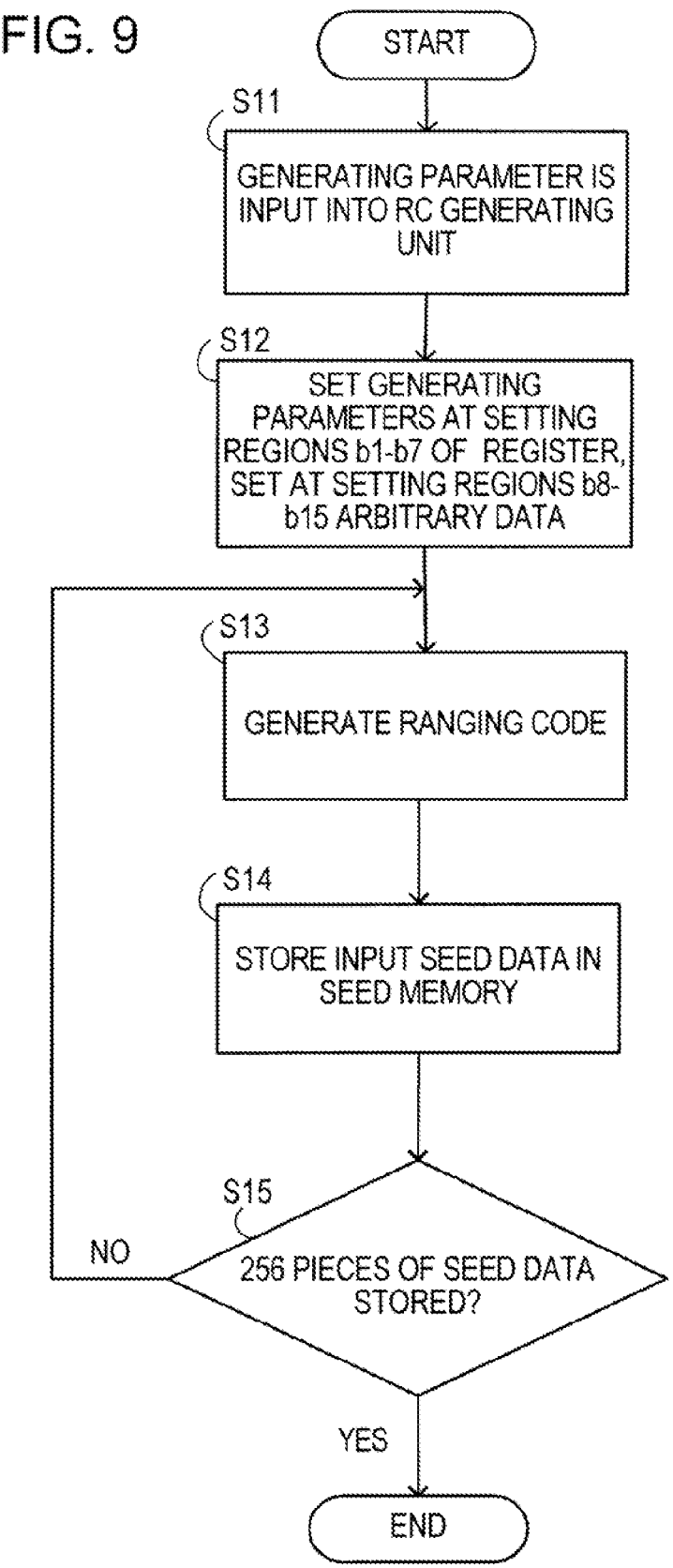
FIG. 9 is a flow diagram for illustrating a generation process of the seed data.

FIG. 9 is a flow diagram for illustrating a generation process of the seed data. The generation process of the seed data is also performed at the initial ranging which the communication apparatus 1 performs when first connecting with the base station, or at an update of generating parameter after a communication link is established between the communication apparatus 1 and the base station.

Process S11: When the generating parameter GP is input from the MAC unit 30 into the RC generating unit 50, the RC generating unit 50 outputs the control signal Ctl indicating that to the selector 51, the RC_SD generating unit 52, and the switch 53. When the control signal Ctrl which indicates the generating parameter GP is input from the MAC unit 30 into the RC generating unit 50 is input, the selector 51 outputs the input generating parameter GP to the RC_SD generating unit 52.

Process S12: The RC_SD generating unit 52 sets 7 bit generating parameter GP at the setting regions b1 through b7 of the register 55a illustrated in FIG. 6, and sets at the setting regions b8 through b15 arbitrary data, for example, "11010100". At the same time, the RC_SD generating unit 52 outputs to the switch 53 the binary sequence set at the register 55a, that is, the seed data SD#1. The switch 53 outputs the input seed data SD to the seed memory 54, according to the control signal Ctrl explained at the process S11. That is, the seed memory 54 stores the input seed data SD. At this time, the RC generating unit 50 manages the seed data SD in relation with an identifier SD#1 indicating the order of the generation of the seed data.

Process S13: The RC_SD generating unit 52 generates the XOR data of 144 bit length as ranging code data for transmission, by using the PRBS generator 55, as explained in FIG. 6.

When having generated one ranging code, the RC_SD generating unit 52 counts up a total counter Tc which indicates the total number of the generated ranging codes. Here, the initial value of the total counter Tc is 0. The total counter Tc+1 is assumed to be as the identifier of the generated seed data. Besides using the total counter Tc, for example, a memory address, at which the seed data is stored, or the like may be used as the identifier of the seed data, as long as the generation order of the seed data is identified.

Process S14: After terminating generating the ranging code at the process S13, RC_SD generating unit 52 outputs to the switch 53 the binary sequence set at the register 55a as the seed data SD. The switch 53 outputs to the seed memory 54 the input seed data SD according to the control signal Ctrl explained at the process S11. That is, the seed memory 54 stores the input seed data SD. At this time, as explained at the process S12, the RC generating unit 50 manages the seed data SD in relation with the identifier SD#i.

Process S15: The RC_SD generating unit 52 determines whether or not it performed the processes S13 and S14 256 times, that is, whether or not 256 pieces of the ranging codes are generated, and all the 256 pieces of the seed data respectively corresponding to the 256 ranging codes are stored in the seed memory 54. If 256 pieces of the seed data are stored (YES at the process S15), the generation process of the seed data is terminated. If 256 pieces of the seed data are not all stored (No at the process S15), the operation returns to the process S13.

Figure 10:
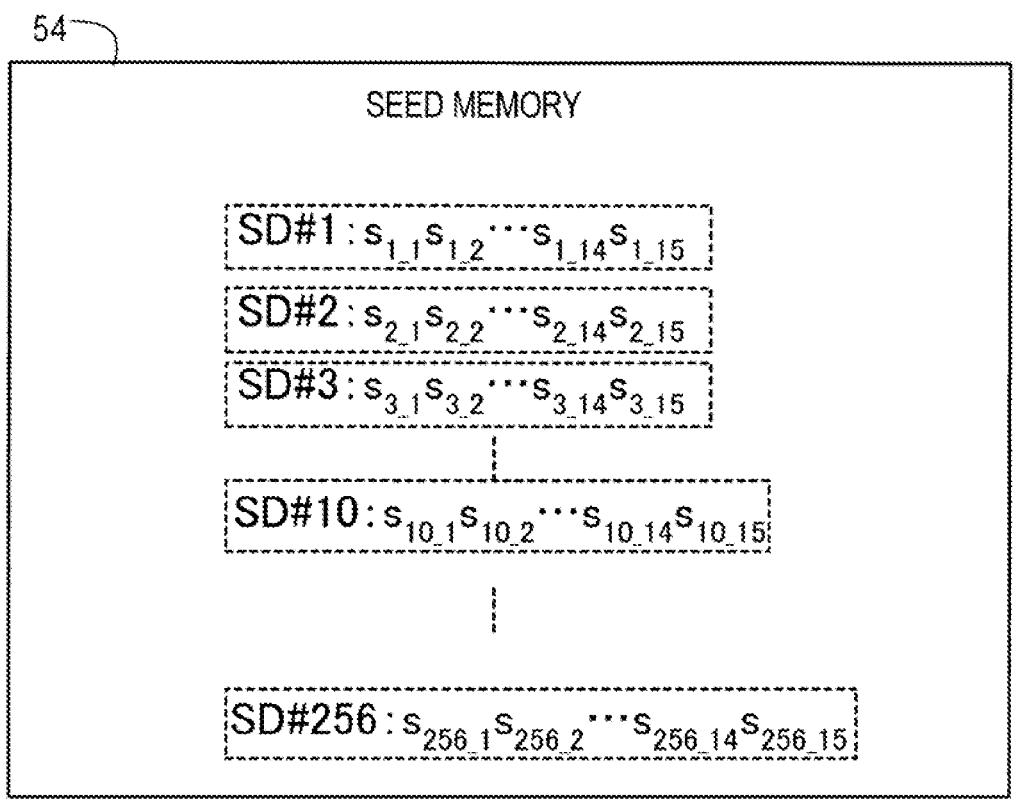
FIG. 10 is a drawing for illustrating the seed data SD#1 through #256 stored in a memory.

FIG. 10 is a diagram illustrating the seed data SD#1 through #256 stored in the seed memory 54 at the time of the end of the generation process of the seed data. Sm_n of the seed data SD#i represent bits constituting the seed data SD#i, m represents an integer from 1 through 256 indicating the generation order of the seed data, and n represents an integer from 1 through 15 indicating the order of the bits constituting this seed data. This SD#i corresponds to the above described identifier of the seed data.

As apparent from the explanation of FIG. 8 through 10, the RC generating unit 50 performs repeatedly a process for generating the first ranging code RC#1 by performing the logical operation to the first seed data SD#1 and a process for generating the second ranging code RC#2 by performing the logical operation to the second seed data SD#2 generated when the first ranging code RC#1 is generated, until the generation of the Nth ranging code, to generate the 1st through Nth seed data respectively corresponding to the 1st through Nth ranging codes, and storing the 1st through Nth seed data in the seed memory 54. Therefore, the RC generating unit 50 is enabled to generate the ranging code RC#I by performing the generation process of the ranging code, as explained at the process S13, to the seed data SD#i.

Here, the communication apparatus 1 is assumed to receive a specification data to specify a transmission of the ranging code RC#i. In this case, the RC generating unit 50 reads out a seed data having an identifier corresponding to the specification data (the ranging code RC#i), that is, the seed data SD#i having the same identifier (the identification number #i) as the specification number #i of RC#i. Then, the RC generating unit 50 is enabled to generate the ranging code RC#i by setting the read out seed data SD#i at the register 55a of the PRBS generator 55 and performing the process explained at the process S13.

Figure 11:
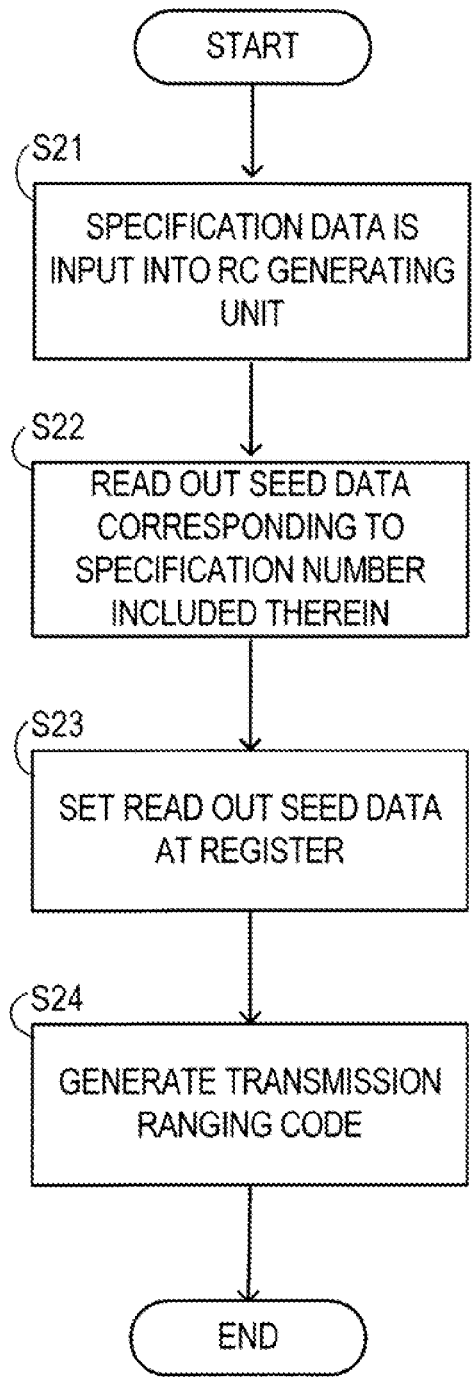
FIG. 11 is a flow diagram for illustrating a generation process of a transmission ranging code.

FIG. 11 is a flow diagram for illustrating the generation process of a ranging code for transmission. The generation process of the transmission ranging code is performed, besides the initial ranging as explained in FIG. 9, for example, at a periodical ranging which the communication apparatus 1 in a status of being connected with the base station periodically performs, at a hand-over ranging performed at the time of hand-over, or at the ranging at the time of band request.

Process S21: When the specification data D is input from the MAC unit 30 into the RC generating unit 50, the RC generating unit 50 outputs a control signal Ctl indicating that to the selector 51, the RC_SD generating unit 52, and the switch 53.

Process S22: After outputting the control signal Ctrl which indicates the specification data D is input from the MAC unit 30 into the RC generating unit 50, the RC generating unit 50 reads out the seed data SD#i corresponding to the specification number #i included in the specification data D from among the seed data SD#1 through #256 stored in the seed memory 54. Here, the RC generating unit 50 reads out the seed data SD#i of the same identifier as the specification number #i.

Process S23: The RC generating unit 50 outputs to the selector 51 the seed data SD#i read out from the seed memory 54, and the selector 51 outputs the seed data SD#i to the RC_SD generating unit 52. The RC_SD generating unit 52 sets the input seed data SD#i at the register 55a of the PRBS generator 55.

Process S24: The RC_SD generating unit 52 makes the PRBS generator 55 perform a computation process of the XOR data Ck and a bit-shift process 144 times to generate the ranging code RC#i for transmission consisting of 144 bits.

As the above, the RC_SD generating unit 52 performs a process for performing the logical operation to the seed data corresponding to the specification data of the transmission ranging code received from the base station among the 1st through Nth seed data to generate the ranging code RC#i for transmission.

The RC_SD generating unit 52 outputs the generated ranging code RC#i to the switch 53, and then the switch 53 outputs the input ranging code RC#i to the UL_PHY unit 40.

Figure 1:
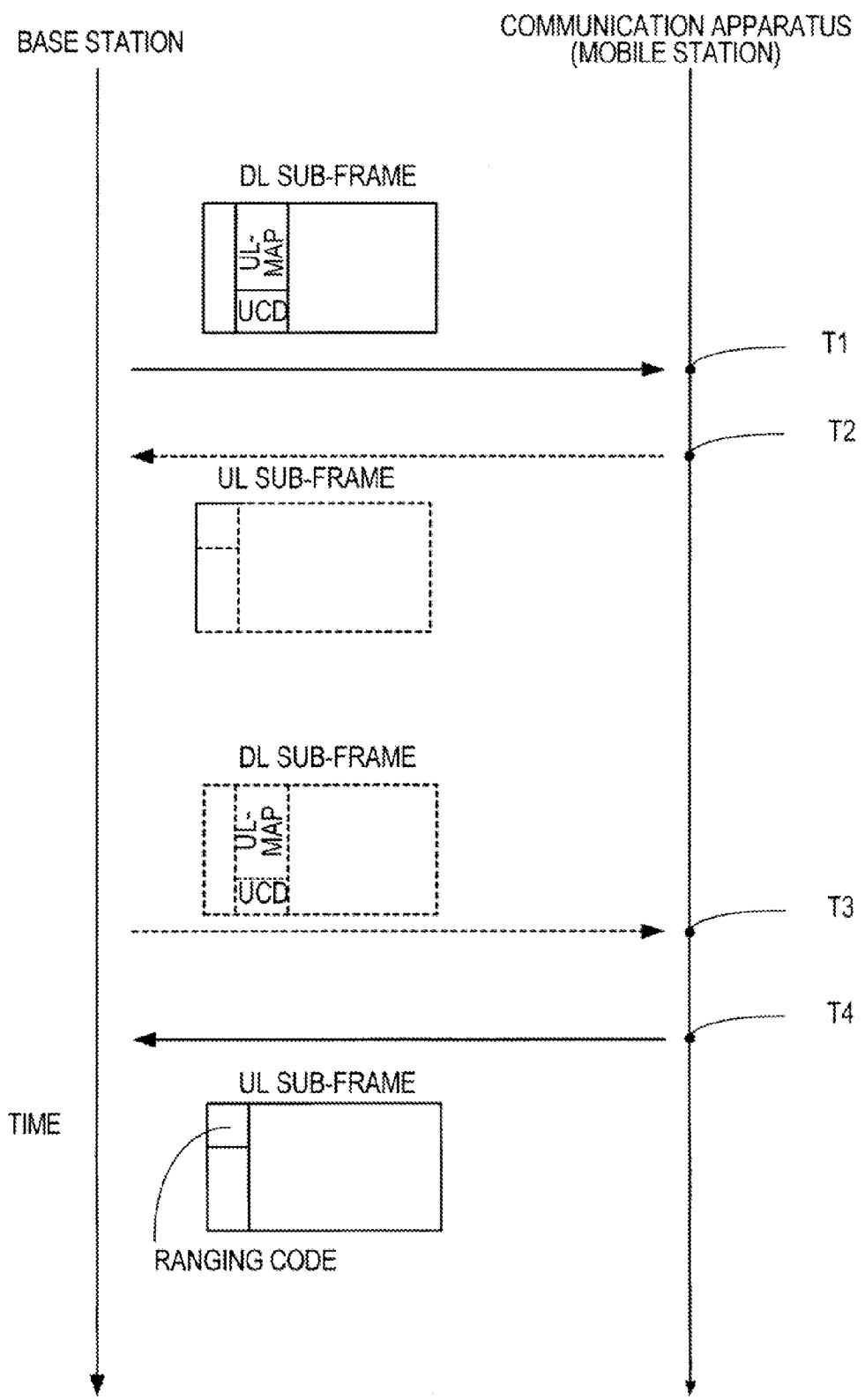
FIG. 1 is a timing diagram of a transmission and reception of radio frames transmitted and received when communication between a base station and a communication apparatus (a mobile-station) is performed.
Figure 2:
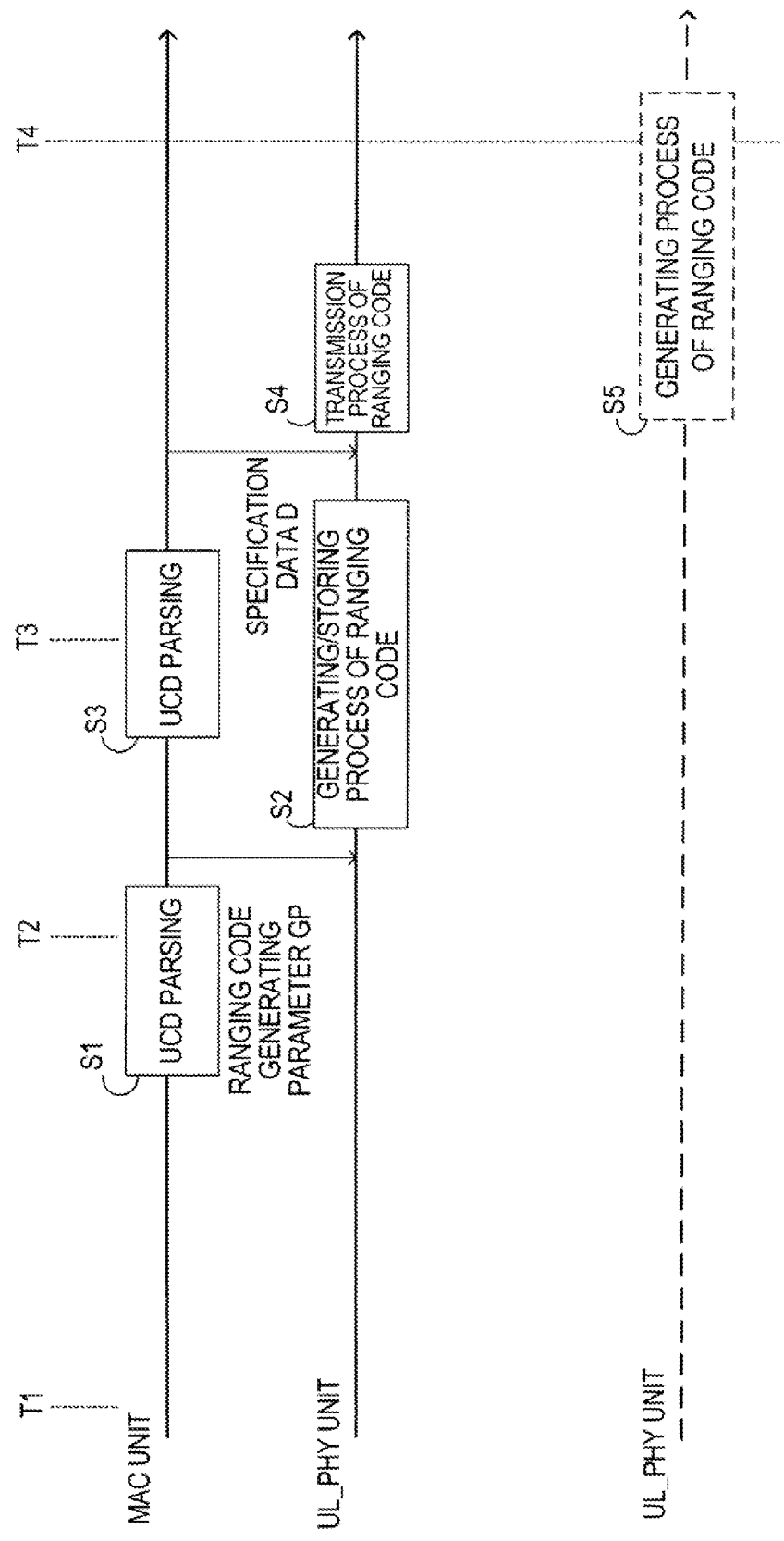
FIG. 2 is a timing diagram for illustrating processes for generation and transmission of ranging codes performed by the communication apparatus.

The UL_PHY unit 40 registers the input ranging code RC#i in the ranging region of the UL sub-frame, and transmits it via the RF unit 10 to the base station (see the timing T4 of FIG. 1).

Figure 12:
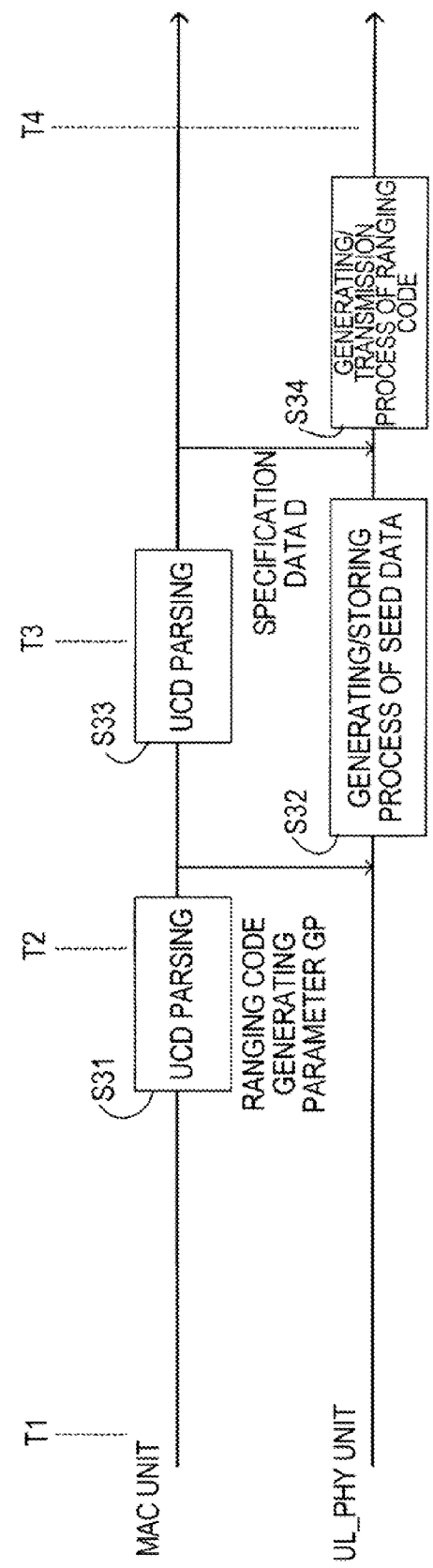
FIG. 12 is a timing diagram for illustrating processes for a generation of the seed data and a transmission of the ranging code, explained in the first embodiment.

FIG. 12 is a timing diagram for illustrating a generation of the seed data and transmission process of the ranging code. Timings T1 through T4 of FIG. 12 respectively correspond to the timings T1 through T4 of FIG. 1. The MAC unit 30 parses the UCD (process S31) and obtains the generating parameter GP. Then, the RC_SD generating unit 52 performs generation of the seed data and storing process as explained in FIG. 9 (process S32).

Next, the MAC unit 30 parses the UCD (process S33), and obtains the specification data D of the transmission ranging code. Then, the RC_SD generating unit 52 generates the transmission ranging code corresponding to the specification data D, as explained in FIG. 11, and the UL_PHY unit 40 and the RF unit 10 perform a process for transmitting the transmission ranging code to the base station (process S34).

For generating the transmission ranging code, the RC_SD generating unit 52 performs the process S13 of FIG. 9 (the process S24 of FIG. 11) once, and the processing time therefor is short. Thus, the timing to transmit the ranging code to the base station is not delayed. In other words, latency before transmitting the ranging code is suppressed.

According to the first embodiment, for generating the transmission ranging code, the communication apparatus 1 stores 256 pieces of 15 bit seed data SD in the seed memory 54. Thereby, the required memory capacity of the seed memory 54 is at most 0.48 K Byte (15 bits*256/8). As a result, comparing to storing 256 pieces of 144 bit ranging codes in the memory, the memory capacity is reduced by almost 90% ((4.6−0.48)/4.6×100%).

The Second Embodiment

A method for reducing more memory capacity than the first embodiment will be explained. In the first embodiment, the communication apparatus stores all of the generated seed data in the memory. In the second embodiment, the communication apparatus stores the pieces of generated seed data with an interval of one or more pieces (referred to as a prescribed number of pieces, hereafter) into the memory and thereby further reduces the memory capacity used for generating the ranging code.

Figure 13:
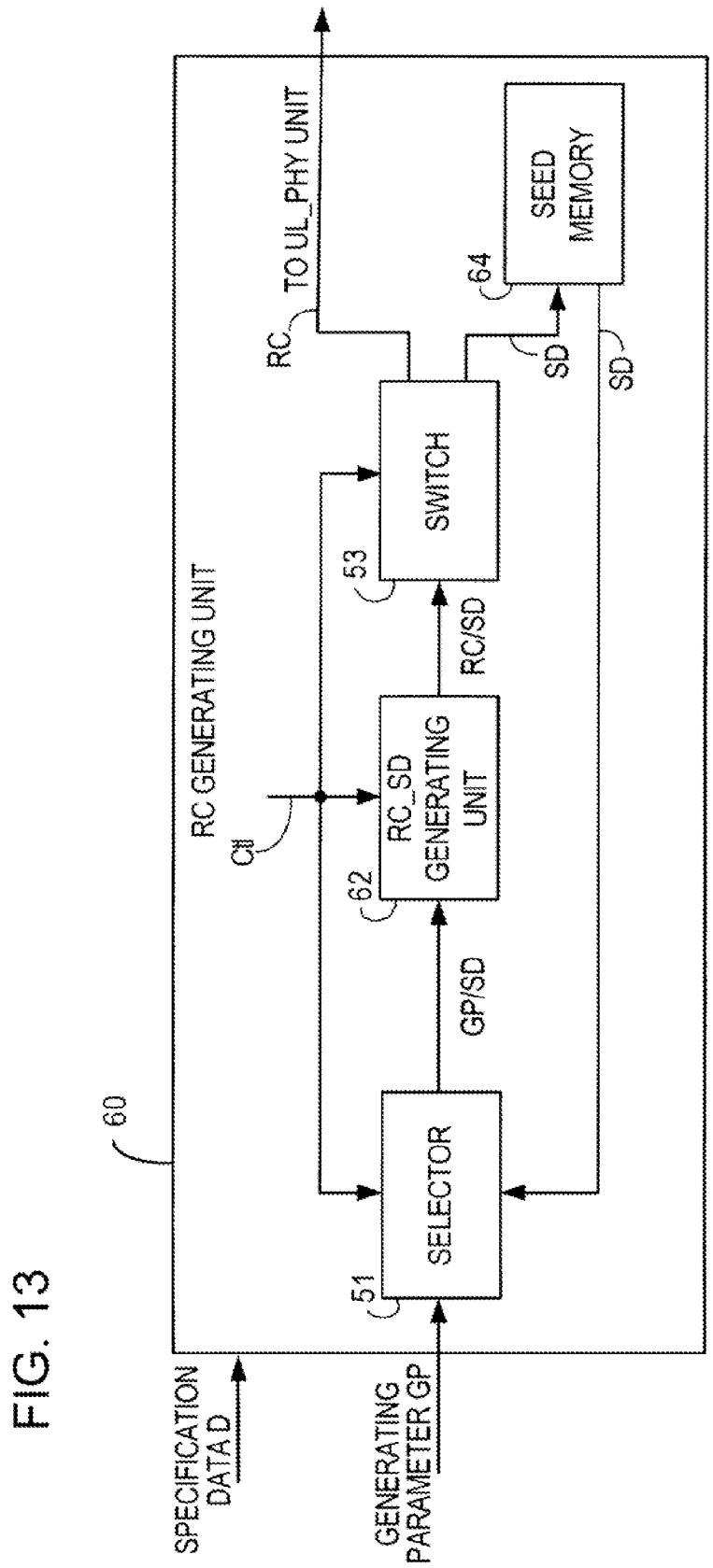
FIG. 13 is a functional block diagram of a RC generating unit which generates ranging codes which will be explained in the second embodiment.

FIG. 13 is a functional block diagram of the RC generating unit for generating the ranging code, which will be explained in the second embodiment. Here, for the functional blocks having the same functions as described in the FIG. 5, the same notations are used and explanations therefor will be omitted.

The RC_SD generating unit 62 stores one piece in every prescribed number of pieces of the seed data among the seed data corresponding to sequentially generated ranging code (sequential ranging code) into the seed memory 64. Here, the prescribed number is modifiable. For example, the RC_SD generating unit 62 stores the binary sequence set at the register 55a of the PRBS generator 55 as the seed data SD#p+1 into the seed memory 64, at the timing of finishing the generation of the ranging code RC#p (p is a multiple of (the prescribed number+1)).

When the RC_SD generating unit 62 stores, for example, pieces of the seed data with an interval of 1 piece (the prescribed number is 1) into the seed memory 64, the seed data SD#1, SD#3, SD#5 . . . are stored in the seed memory 64. In the explanation below, the RC_SD generating unit 62 is assumed to store, for example, pieces of the seed data with an interval of 9 pieces (the prescribed number is 9) into the seed memory 64. In this case, the seed data SD#1, SD#11, SD#21, . . . , and SD#251 are stored in the seed memory 64.

Figure 14:
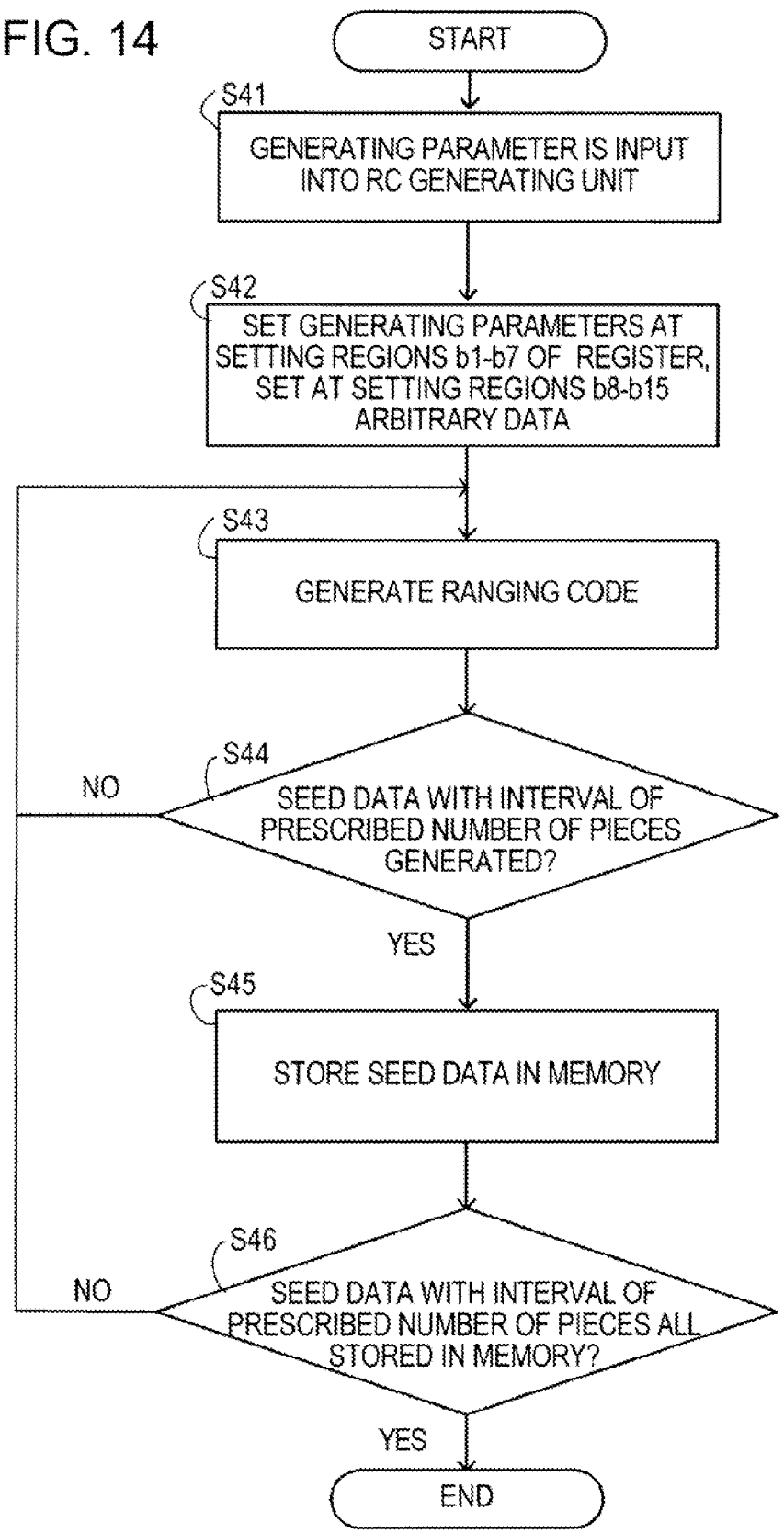
FIG. 14 is a flow diagram for illustrating a generation process of the seed data.

FIG. 14 is a flow diagram for illustrating the generation process of the seed data.

Processes S41 through S43 are the same as the processes S12 through S33 of FIG. 9, and explanations therefor will be omitted. Here, at the process S43, as explained at the process S13, the total counter Tc of the generated ranging code is counted up.

Process S44: The RC_SD generating unit 62 determines whether or not it generated the seed data with an interval of the prescribed number of pieces. That is, whether or not the generation of the ranging code RC#p is completed is determined. In the above described example, the RC_SD generating unit 62 determines whether or not the generation of the ranging codes RC#10, #20, #30, . . . , and #250 is completed. If the total counter Tc of the ranging code is devisable by the prescribed number +1, the RC_SD generating unit 62 determines that pieces of the seed data with an interval of the prescribed number of pieces are generated.

Process S45: If the generation of the seed data with an interval of the prescribed number of pieces is completed (Yes at the process S44), the RC_SD generating unit 62 outputs the binary sequence set at the register 55a to the switch 53 as the seed data, at the timing of the completion of the generation of the seed data (the ranging code) at the process S43. The switch 53 outputs the seed data SD to the seed memory 64 according to the control signal Ctrl explained at the process S11. Here, the first piece of the seed data SD#1 is the binary sequence set at the register 55a at the process S42. At this time, as explained at the process S12, S14 of FIG. 9, the RC generating unit 60 manages the seed data SD in relation to the identifier of the seed data SD, for example, the total counter Tc.

If the generation of the seed data with an interval of the prescribed number of pieces is not completed (NO at the process S44), the RC generating unit 60 returns to the process S43.

Process S46: The RC_SD generating unit 62 determines whether or not it stored all the seed data with an interval of the prescribed number of pieces in the seed memory 64. If all of the seed data with an interval of the prescribed number of pieces is stored in the seed memory 64 (YES at the process S46), the RC_SD generating unit 62 terminates the process. If not (NO at the process S46), the operation returns to the process S43. In the above example, the RC_SD generating unit 62 determines all of the seed data with an interval of the prescribed number of pieces is stored in the seed memory 64, at the time the seed data of SD#251 is stored in the seed memory 64. Alternatively, the process may be terminated when 256 pieces of the ranging code are generated, and the process S43 may be performed while 256 pieces of the ranging code are not generated. By the processes of FIG. 14, the seed data with an interval of the prescribed number of pieces is stored in the seed memory 64.

Figure 15:
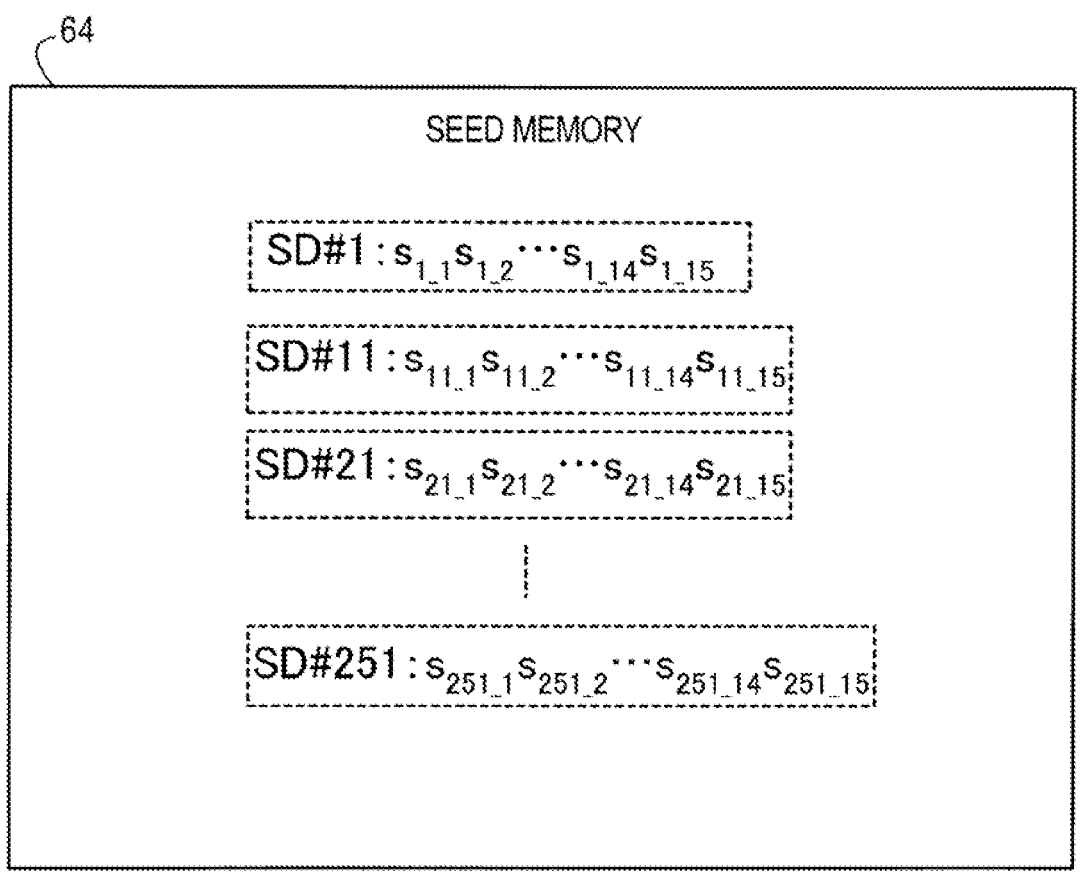
FIG. 15 is a drawing for illustrating the seed data with an interval of the prescribed number of pieces, SD#1, #10, #20 . . . , #250, stored in the memory.

FIG. 15 is a drawing for illustrating a status such that pieces of the seed data with an interval of 9 pieces, SD#1, #11, #21, . . . , and #251 are stored in the memory.

Next, the generation process of the transmission ranging code will be explained. The communication apparatus 1 is assumed to receive the specification data D specifying the ranging code RC#i to be transmitted. In this case, the RC generating unit 60 reads out, in response to reception of the specification data D, the seed data corresponding to the specification data D from the memory 64, or reads out, if the corresponding seed data does not exist, the seed data, which is generated immediately prior to the generation of the corresponding seed data and stored in the memory 64, from the memory 64.

For example, the RC generating unit 60 reads out from among the seed data SD#1 through #256 stored in the seed memory 64 the seed data SD#i of the same identifier (the identification number i) as the specification number i of the ranging code RC#i, or, if this seed data SD#i does not exist, the seed data which has an identifier smaller than the specification number #i, wherein the difference between the identifier and the specification number #i is the smallest. Hereafter, the read out seed data is referred to as the seed data SD#s. In the above example, the RC generating unit 60 reads out the seed data SD#1 in the case of the specification number #1, and reads out the seed data SD#21 in the case of the specification number #24.

Then, the RC_SD generating unit 62 generates the transmission ranging code by repeatedly performing the logical operation to the read out seed data SD#s according to the specification data D until the transmission ranging code specified by the specification data D is generated.

Figure 16:
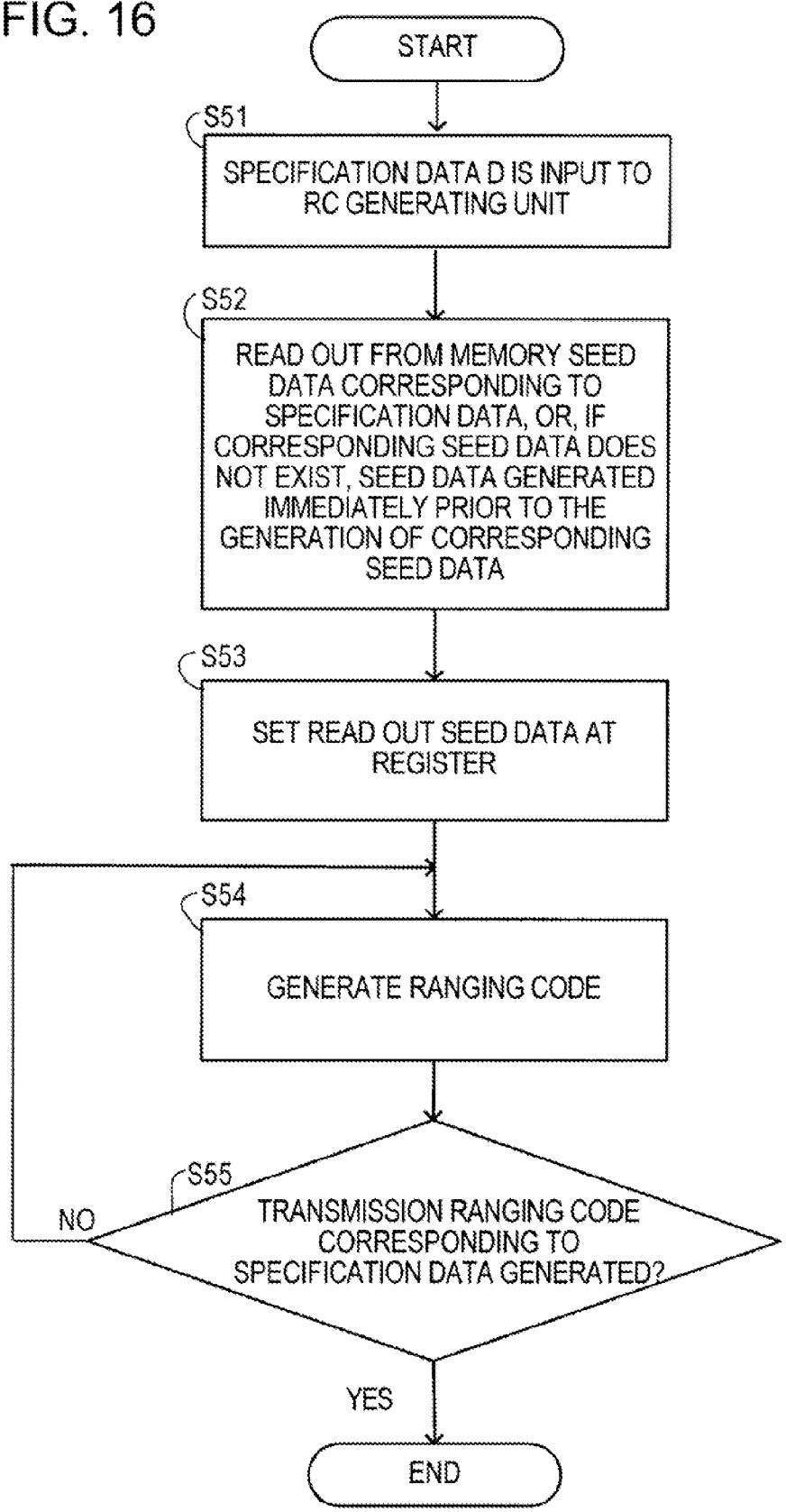
FIG. 16 is a flow diagram for illustrating a generation process of the transmission ranging code.

For example, the RC_SD generating unit 62 determines the number of repetition of the process for generating the ranging code, that is, the process S54 of FIG. 16, according to the specification data D and the identifier of the read out seed data. For example, the repetition number is determined by Formula 1.

Number of repetition: $X$="the specification number #$i$"−"the identifier of the read out seed data SD#$s$"+1 (Formula 1)

In the above example, the RC generating unit 60 reads out the seed data SD#1 in the case of the specification number #1. In this case, the RC generating unit 60 determines the repetition number X to be 1. Also, in the case of the specification number #24, the seed data SD#21 was read out. In this case, the RC generating unit 60 determines the repetition number X to be 4.

Then, the RC_SD generating unit 62 repeatedly performs the process for generating the ranging code according to the determined repetition number, and thereby generates the transmission ranging code specified by the specification data.

FIG. 16 is a flow diagram for illustrating the generation process of the transmission ranging code.

Process S51: If the specification data D is input to the RC generating unit 60 from the MAC unit 30, the RC generating unit 60 outputs a control signal Ctl indicating that to the selector 51, the RC_SD generating unit 62, and the switch 53.

Process S52: The RC generating unit 60 outputs the control signal Ctrl, and then, as above described, reads out the seed data corresponding to the specification data D from the memory 64, or, if the corresponding seed data does not exist, reads out from the memory 64 the seed data SD#s which is generated immediately prior to the generation of the corresponding seed data and is stored in the memory 64. Then, according to the Formula 1, the repetition number X is determined.

Process S53: The RC generating unit 60 outputs the read out seed data SD#s to the selector 51, and the selector 51 outputs the seed data SD#s to the RC_SD generating unit 62. The RC_SD generating unit 62 sets the input seed data SD#s at the register 55a of the PRBS generator 55.

Process S54: The RC_SD generating unit 62 makes the PRBS generator 55 perform the computation process of the XOR data Ck and the bit-shift process 144 times to generate the ranging code consisting of 144 bits. At this time, the RC_SD generating unit 62 counts up the total counter Tc which indicates the total number of the generated ranging codes. Here, the initial value of the total counter Tc is 0.

Process S55: The RC generating unit 60 determines whether or not the generated ranging code is the transmission ranging code at the process S54. For example, the RC generating unit 60 determines the generated ranging code is the transmission ranging code when the Formula 2 is satisfied.

The total counter Tc=determined repetition number X (Formula 2)

In the above example, the RC generating unit 60 reads out the seed data SD#1 in the case of the specification number #1, and determines the repetition number X to be 1. In this case, the RC generating unit 60 generates, by performing the process S54 once, the transmission ranging code RC#1. Also, in the case of the specification number #24, the seed data SD#21 is read out, and the repetition number X is determined to be 4. In this case, the RC generating unit 60 generates, by performing the process S54 four times, the transmission ranging code RC#24.

Thereafter, the RC generating unit 50 outputs the generated ranging code RC#i to the switch 53, and the switch 53 outputs the input ranging code RC#i to the UL_PHY unit 40.

The UL_PHY unit 40 registers the input ranging code RC#i in the ranging region of the UL sub-frame, as explained at the process S24 of FIG. 11, and transmits the ranging code to the base station via the RF unit 10.

Thereby, the memory capacity used when the generation of the ranging code is reduced to less size than the memory size explained in the first embodiment. For example, the memory size is reduced to (0.48/(the prescribed number+1)) K Byte as the minimum.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
a transmitting and receiving unit which is configured to perform a transmission and reception of data with a base station,
a generating unit which is configured to generate a ranging code based on seed data including a binary sequence shorter than the ranging code which is a code for transmission control,
a memory which is configured to store the seed data, wherein
the generating unit is configured to repeat sequentially a process for generating Ith ranging code, I being an integer of 1 or more, and (Ith+1) seed data by performing a logical operation to Ith seed data from I=1 to I=N, N being an integer of 2 or more, store the 1st through Nth seed data corresponding to the 1st through Nth ranging codes in the memory, and generate a transmission ranging code by performing the logical operation to the seed data corresponding to specification data of the transmission ranging code received from the base station;
the generating unit includes a register at which the seed data is set, and a logic circuit which is configured to perform the logical operation to the seed data of the register to compute logic data, and the generating unit is further configured to perform, after computation of the logic data, a plurality of times a process for bit-shifting a binary sequence set at the register and for inputting the computed logic data to an empty bit region of the register to store the seed data in the register, and generate the ranging code including a plurality of the logic data.

2. The communication apparatus according to claim 1, wherein the 1st seed data includes a ranging code generating parameter transmitted form the base station and arbitrary data.

3. The communication apparatus according to claim 1, wherein the logic circuit is configured to compute XOR data of bits included in the seed data set at the register.

4. The communication apparatus according to claim 1, wherein the generating unit is further configured to make, when generating the 1st ranging code, the seed data set at the register be the 2nd seed data.

5. The communication apparatus according to claim 1, wherein the generating unit is further configured to store into the memory the seed data with an interval of a prescribed number of pieces among the seed data corresponding to sequential ranging codes.

6. The communication apparatus according to claim 5, wherein the generating unit is further configured to read out from the memory, in response to a reception of the specification data, the seed data corresponding to the specification data, or read out from the memory, when the corresponding seed data does not exist, seed data which is generated and stored in the memory immediately before the generation of the seed data, and the generating unit is configured to generate in relation to the specification data the transmission ranging code by repeatedly performing the logical operation to the read out seed data.

7. The communication apparatus according to claim 3, wherein the register includes a capacity of 15 bits, wherein the logic circuit is configured to compute XOR data of bits set at the 1st, 4th, 7th, and 15th digits counted from the least significant bit of the register.

8. The communication apparatus according to claim 7, wherein a bit length of the ranging code is 144 bits, and a bit length of the seed data is 15 bits.

9. The communication apparatus according to claim 8, which is configured to perform communication with the base station by Worldwide Interoperability for Microwave Access.

10. A method for communication comprising:

generating a 1st ranging code by performing a logical operation to 1st seed data including a binary sequence shorter than a ranging code which is a code for transmission control, repeating sequentially a process for generating Ith ranging code, Ith being an integer of 1 or more, and (Ith+1) seed data by performing a logical operation to Ith seed data from I=1 to I=N, N being an integer of 2 or more, storing the 1st through Nth seed data corresponding to the 1st through Nth ranging codes in a memory, performing the logical operation to seed data corresponding to specification data of a transmission ranging code received from a base station to generate the transmission ranging code, setting the seed data at a register;

performing the logical operation to the seed data of the register to compute logic data, performing, after computation of the logic data, a plurality of times a process for bit-shifting a binary sequence set at the register, and for inputting the computed logic data to an empty bit region of the register to store the seed data in the register, and generating the ranging code including a plurality of the logic data.

* * * * *